(12) United States Patent
Kobayashi et al.

(10) Patent No.: US 10,232,554 B2
(45) Date of Patent: Mar. 19, 2019

(54) THREE-DIMENSIONAL PRINTING SYSTEM INCLUDING THREE-DIMENSIONAL PRINTING APPARATUS AND SUPPORT ARRANGEMENT DETERMINING APPARATUS

(71) Applicant: Roland DG Corporation, Hamamatsu-shi, Shizuoka (JP)

(72) Inventors: Kouichi Kobayashi, Hamamatsu (JP); Tetsuhiro Kunifuji, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 174 days.

(21) Appl. No.: 15/184,070

(22) Filed: Jun. 16, 2016

(65) Prior Publication Data

US 2016/0368223 A1 Dec. 22, 2016

(30) Foreign Application Priority Data

Jun. 17, 2015 (JP) ................................. 2015-122388

(51) Int. Cl.
| | |
|---|---|
| *B29C 64/386* | (2017.01) |
| *B29C 64/40* | (2017.01) |
| *B29C 64/129* | (2017.01) |
| *B33Y 30/00* | (2015.01) |
| *B33Y 50/02* | (2015.01) |
| *B33Y 10/00* | (2015.01) |

(52) U.S. Cl.
CPC .......... *B29C 64/386* (2017.08); *B29C 64/129* (2017.08); *B29C 64/40* (2017.08); *B33Y 10/00* (2014.12); *B33Y 30/00* (2014.12); *B33Y 50/02* (2014.12)

(58) Field of Classification Search
CPC ........ B29C 64/30; B29C 64/40; B29C 64/386
See application file for complete search history.

(56) References Cited

U.S. PATENT DOCUMENTS

| | | | | |
|---|---|---|---|---|
| 5,303,141 | A | * 4/1994 | Batchelder | ............. B29C 41/36 156/244.11 |
| 2002/0155189 | A1 | 10/2002 | John | |
| 2013/0053995 | A1 * | 2/2013 | Hashimoto | ............. B29C 64/00 700/97 |

(Continued)

FOREIGN PATENT DOCUMENTS

JP 2003-039564 A 2/2003

*Primary Examiner* — Timothy Kennedy
(74) *Attorney, Agent, or Firm* — Keating & Bennett, LLP

(57) ABSTRACT

An arrangement determining apparatus includes a center-of-gravity calculating processor that calculates a center of gravity of a three-dimensional model, a placement surface determining processor that determines a placement surface to attach and arranging supports thereon, a reference point setting processor that draws a perpendicular line from the center of gravity toward the placement surface and sets a reference point, a region dividing processor that divides the placement surface into a first region and a second region excluding the first region, and an arranging processor that attaches and arranges the supports on the placement surface so that the contact area per unit area between the first region and the supports in the first region is larger than the contact area per unit area between the second region and the supports in the second region.

7 Claims, 12 Drawing Sheets

(56) References Cited

U.S. PATENT DOCUMENTS

| | | | |
|---|---|---|---|
| 2015/0134095 A1* | 5/2015 | Hemani | G06T 19/00 700/98 |
| 2016/0018320 A1* | 1/2016 | Hess | G01N 21/35 702/81 |
| 2016/0096330 A1* | 4/2016 | Trowbridge | B33Y 10/00 264/104 |
| 2016/0221262 A1* | 8/2016 | Das | G03F 7/70416 |
| 2016/0368222 A1* | 12/2016 | Kobayashi | G05B 19/4099 |
| 2017/0036783 A1* | 2/2017 | Snyder | B64G 1/1078 |

* cited by examiner

US 10,232,554 B2

THREE-DIMENSIONAL PRINTING SYSTEM INCLUDING THREE-DIMENSIONAL PRINTING APPARATUS AND SUPPORT ARRANGEMENT DETERMINING APPARATUS

CROSS REFERENCE OF RELATED APPLICATION

The present application claims priority from Japanese Patent Application No. 2015-122388, filed on Jun. 17, 2015, which is incorporated by reference herein in its entirety.

BACKGROUND OF THE INVENTION

1. Field of the Invention

The present invention relates to a support arrangement determining apparatus, a three-dimensional printing system, and a method of determining a support arrangement.

2. Description of the Related Art

A three-dimensional printing apparatus for forming a desired three-dimensional printed object (hereinafter referred to as a "target object") by successively stacking layers of a resin material each having a predetermined cross-sectional shape and curing the resin material is conventionally known. This type of three-dimensional printing apparatus forms a target object in the following manner. First, data of a cross-sectional shape of the target object are prepared using, for example, a CAD apparatus. Next, using the data of the cross-sectional shape, a resin layer having a corresponding shape to the cross-sectional shape is formed by curing a photocurable resin. Then, the resin layers corresponding to the cross-sectional shapes are successively stacked to form the target object.

As shown in JP 2003-39564 A, for example, the three-dimensional printing apparatus has a platform having an opening formed therein, a vat placed on the platform, for accommodating a photocurable resin, a holder disposed above the vat and capable of being raised and lowered, and a lighting device disposed below the platform, for emitting light. The light emitted from the lighting device is applied to the photocurable resin in the vat through the opening in the platform. The part of the photocurable resin in the vat that is exposed to the light is cured. By controlling the position of the light to be applied, the position of the resin to be cured can be changed as desired. As a result, a resin layer having a desired cross-sectional shape can be formed. Then, by elevating the holder step by step, resin layers can be formed consecutively toward the bottom. In this way, the desired target object is formed.

When elevating the holder step by step, a resin layer that has been formed needs to support the load of all the resin layers that are to be formed below that resin layer. If there is a resin layer with a small cross-sectional area, it is possible that the resin layer with a small cross-sectional area may not be able to support the load of all the resin layers therebelow. As a consequence, part of the target object may break while forming the target object. In order to prevent such breakage, as illustrated in FIG. 21, a plurality of support objects 130 for supporting part of the load of a target object 170 are attached between a portion of the target object 170 and a holder 113 while forming the object through computing with a dedicated apparatus, such as a CAD apparatus. Then, a whole object where the target object 170 and the support objects 130 are integrated with each other is formed. Hereinafter, the support objects may simply be referred to as "supports."

The supports 130 are attached and arranged, for example, on one of the surfaces of the target object 170 that faces the holder 113. The plurality of supports 130 have the same shape and cross-sectional area. Depending on the orientation of the target object 170 with respect to the holder 113, the surface of projection of the target object 170 with respect to the holder 113 has a small area, that is, the surface of projection that represents the outer circumferential shape of the target object 170 that is obtained when projecting the target object 170 onto the surface of the holder 113 facing the target object 170 has a small area. As a consequence, the number of the supports 130 attached on the target object 170 becomes insufficient, so that the supports 130 may not be able to sufficiently support the load of the target object 170 during object formation. In addition, when the target object 170 has a thicker portion 170a and a thinner portion 170b, the thinner portion 170b can be supported by a smaller number of supports 130 than that required by the thicker portion 170a. To date, however, the location of the target object 170 on which the supports 130 should be provided and the number of the supports 130 to provided thereon have been determined according to empirical rules developed by the user. For this reason, some users may not be able to attach and arrange the supports 130 at an optimum position.

SUMMARY OF THE INVENTION

Preferred embodiments of the present invention provide a support arrangement determining apparatus, a three-dimensional printing system, and a method of determining a support arrangement that attach and arrange supports optimally with a three-dimensional printing apparatus wherein supports are attached and arranged onto a target object to be formed to form the target object.

A support arrangement determining apparatus according to a preferred embodiment of the present invention is an arrangement determining apparatus that determines the position arrangement of supports, for use with a three-dimensional printing apparatus wherein the supports are attached and arranged on a target object to be formed to form the target object and the supports. The arrangement determining apparatus includes a storing processor, a center-of-gravity calculating processor, a reference point setting processor, a region dividing processor, and an arranging processor. The storing processor is configured or programmed to store data of a three-dimensional model of the target object model. The center-of-gravity calculating processor is configured or programmed to calculate a center of gravity of the three-dimensional model stored in the storing processor. The placement surface determining processor is configured or programmed to determine a placement surface of the three-dimensional model on which the supports are attached and arranged. The reference point setting processor is configured or programmed to draw a perpendicular line from the center of gravity calculated by the center-of-gravity calculating processor toward the placement surface determined by the placement surface determining processor, and set a reference point at which the perpendicular line and the placement surface intersect. The region dividing processor is configured or programmed to divide the placement surface determined by the placement surface determining processor into a first region and a second region, the first region being within a predetermined area containing the reference point set by the reference point setting processor, and the second region excluding the first region. The arranging processor is configured or programmed to attach and arrange the supports on the placement surface so that, in the first region and the second region divided by the region dividing processor, a contact area per unit area between the first region and the supports attached and arranged in the first region is larger than a contact area per unit area between the second region and the supports attached and arranged in the second region.

With this arrangement determining apparatus, the first region of the placement surface is set at a position closer to the center of gravity of the three-dimensional model than is the second region. By setting the contact area per unit area between the first region and the supports larger than the contact area per unit area between the second region and the supports, the supports are able to support the load of the target object around the center of gravity of the target object corresponding to the three-dimensional model. As a result, the supports are able to stably support the load of the target object, and the supports can be attached and arranged optimally.

In a preferred embodiment of the present invention, the arranging processor is configured or programmed to attach and arrange first supports having a first thickness in the first region, and second supports having a second thickness being less than the first thickness in the second region.

In the present preferred embodiment, the first region is attached and arranged with thicker supports than those attached and arranged in the second region. This enables the thicker supports to be attached and arranged near the center of gravity of the three-dimensional model. The contact area per unit area between the target object and the first supports having a first thickness is larger than the contact area per unit area between the target object and the second supports having a second thickness. As a result, the supports are able to stably support the load of the target object.

In another preferred embodiment of the present invention, the arranging processor is configured or programmed to attach and arrange the supports on the placement surface so that the number of supports attached and arranged in the first region per unit area of the first region is larger than the number of supports attached and arranged in the second region per unit area of the second region.

In the present preferred embodiment, the supports attached and arranged in the first region are arranged more densely, in other words, at narrower intervals, than the supports attached and arranged in the second region. This enables a larger number of supports to be attached and arranged near the center of gravity of the three-dimensional model. As a result, the supports are able to stably support the load of the target object.

In another preferred embodiment of the present invention, the arranging processor is configured or programmed to attach and arrange one of the supports on the reference point of the placement surface.

In the present preferred embodiment, the reference point is the closest point to the center of gravity among points on the placement surface. Thus, the supports are able to support the load of the target object more stably by attaching and arranging one of the supports on the reference point.

In another preferred embodiment of the present invention, the region dividing processor is configured or programmed to divide the placement surface into the first region and the second region so that the reference point is disposed at the center of the first region.

In the present preferred embodiment, the first region is a region centering around the reference point, which is the closest point in the placement surface to the center of gravity of the three-dimensional model. Therefore, the supports are able to support the load of the target object more stably.

In another preferred embodiment of the present invention, the target object includes a forbidden surface on which the supports are not attached or arranged. The placement surface determining processor is configured or programmed to determine the placement surface among the surfaces of the three-dimensional model excluding the forbidden surface.

In some cases, the target object to be formed may have a surface where no support should be attached or arranged. In various preferred embodiments of the present invention, the surface of the target object where no support should be attached or arranged is defined as a forbidden surface. In the present preferred embodiment, the placement surface determining processor does not set the forbidden surface to be the placement surface. As a result, the supports are able to support the load of the target object without attaching and arranging the supports on the forbidden surface.

In another preferred embodiment of the present invention, the support arrangement determining apparatus further includes a display screen and a display processor. The display screen displays the three-dimensional model on which the supports are attached and arranged by the arranging processor. The display processor is configured or programmed to enable the display screen to display the three-dimensional model on which the supports are attached and arranged.

The present preferred embodiment allows the three-dimensional model on which the supports are attached and arranged to be displayed on the display screen. The user is allowed to perceive on which surface of the target object and in what way the supports are to be attached and arranged, in advance of object formation of the target object.

A three-dimensional printing system according to a preferred embodiment of the present invention includes a three-dimensional printing apparatus, and a support arrangement determining apparatus according to any of the preferred embodiments of the present invention described above.

The present preferred embodiment provides a three-dimensional printing system including a support arrangement determining apparatus according to any of the preferred embodiments of the present invention described above.

A method of determining a support arrangement according to a preferred embodiment of the present invention is a method for determining a position arrangement of supports, for use with a three-dimensional printing apparatus wherein the supports are attached and arranged on a target object to be formed to form the target object and the supports. The method of determining a support arrangement includes a center-of-gravity calculating step, a placement surface determining step, a reference point setting step, a region dividing step, and an arranging step. The center-of-gravity calculating step calculates a center of gravity of the three-dimensional model. The placement surface determining step determines a placement surface of the three-dimensional model on which the supports are attached and arranged. The reference point setting step draws a perpendicular line from the center of gravity calculated in the center-of-gravity calculating step toward the placement surface determined in the placement surface determining step, and sets a reference point at which the perpendicular line and the placement surface intersect. The region dividing step divides the placement surface determined in the placement surface determining step into a first region and a second region, the first region being within a predetermined area containing the reference point set in the reference point setting step, and the second region excluding the first region. The arranging step attaches and arranges the supports on the placement surface so that, in the first region and the second region divided in the region dividing step, a contact area per unit area between the first region and the supports attached and arranged in the first region is larger than a contact area per unit area between the second region and the supports attached and arranged in the second region.

In another preferred embodiment of the present invention, in the arranging step, first supports having a first thickness are attached and arranged in the first region, and second supports having a second thickness that is less than the first thickness are attached and arranged in the second region.

In another preferred embodiment of the present invention, in the arranging step, the supports are attached and arranged on the placement surface so that the number of supports attached and arranged in the first region per unit area of the first region is larger than the number of supports attached and arranged in the second region per unit area of the second region.

In another preferred embodiment of the present invention, in the arranging step, one of the supports is attached and arranged on the reference point of the placement surface.

In another preferred embodiment of the present invention, in the region dividing step, the placement surface is divided into the first region and the second region so that the reference point is disposed at the center of the first region.

In another preferred embodiment of the present invention, the target object includes a forbidden surface on which the supports are not attached or arranged. In the placement surface determining step, the placement surface is determined among the surfaces of the three-dimensional model excluding the forbidden surface.

In another preferred embodiment of the present invention, the method further includes a displaying step of displaying the three-dimensional model on which the supports have been attached and arranged, on a display screen for displaying the three-dimensional model.

According to various preferred embodiments of the present invention, supports are attached and arranged on a target object optimally.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinbelow, three-dimensional printing systems including a support arrangement determining apparatus according to preferred embodiments of the present invention, as well as a method of determining a support arrangement, will be described with reference to the drawings. The preferred embodiments described herein are not intended to limit the present invention. The features, components and steps that exhibit the same effects are denoted by the same reference symbols, and repetitive description thereof may be omitted as appropriate.

First Preferred Embodiment

Figure 1:
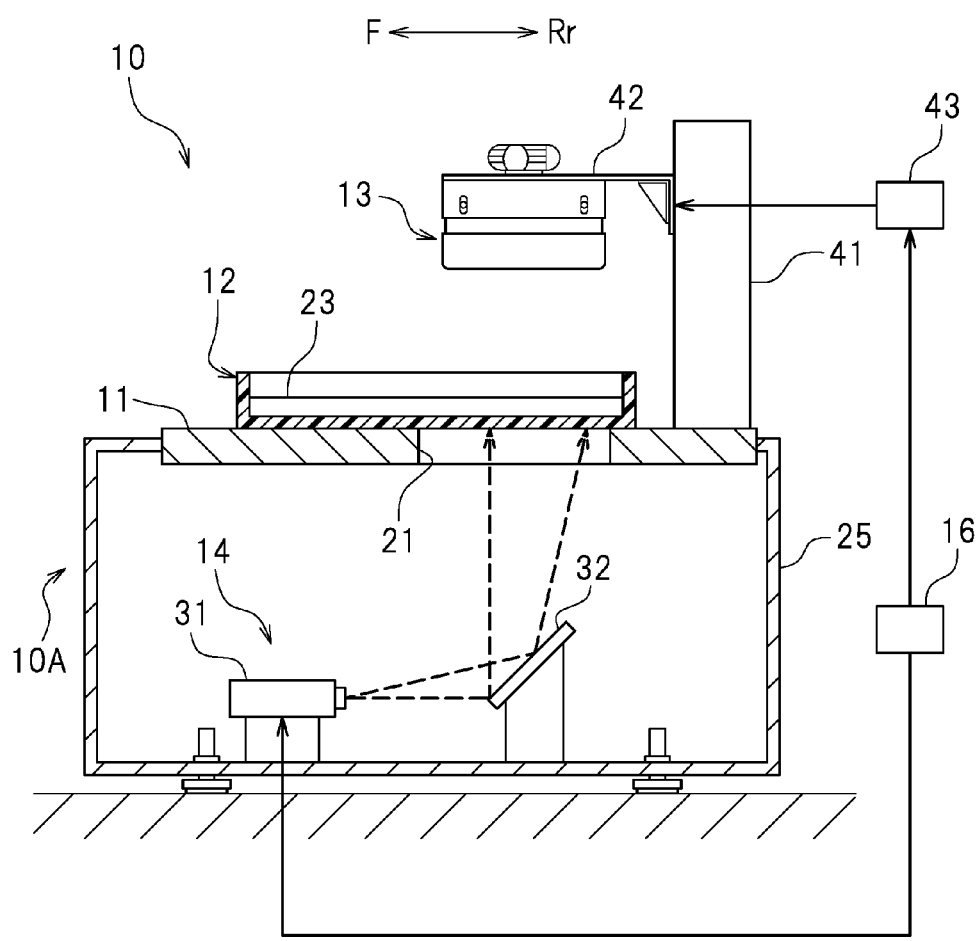
FIG. 1 is a cross-sectional view of a three-dimensional printing system according to a preferred embodiment of the present invention.
Figure 2:
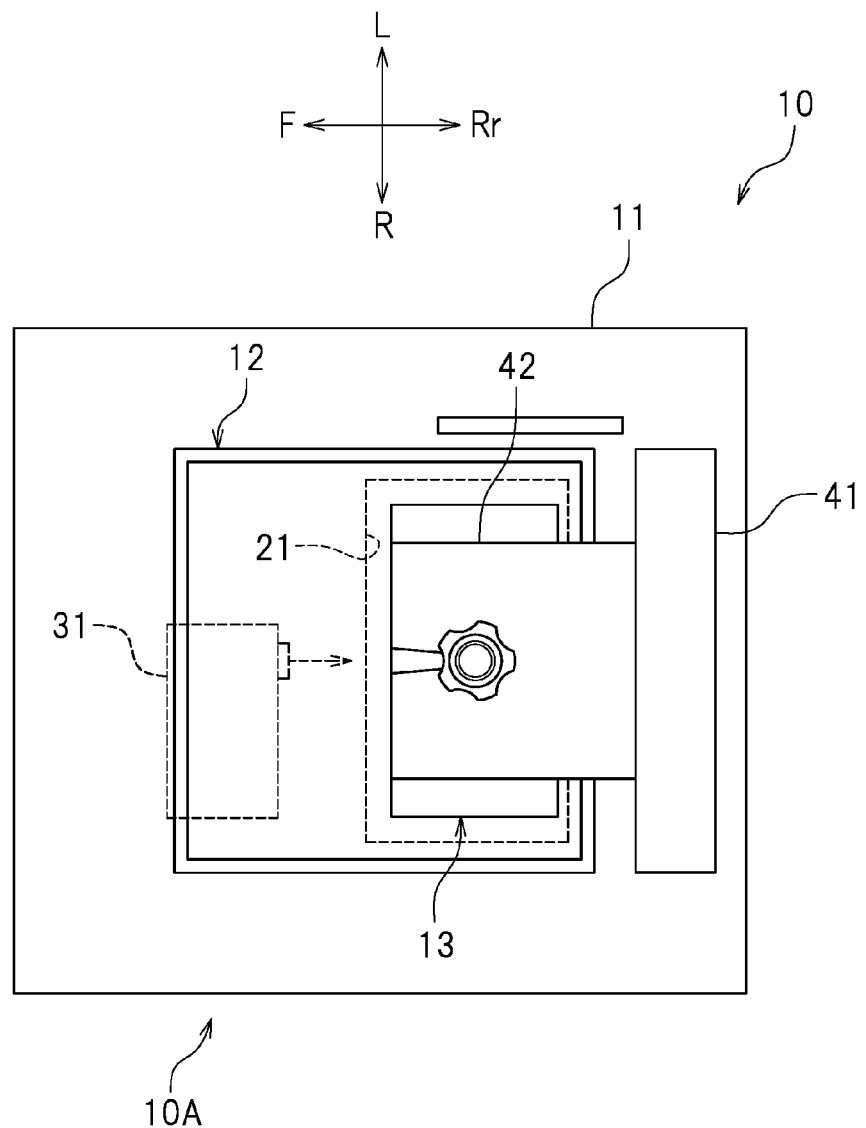
FIG. 2 is a plan view of a three-dimensional printing system according to a preferred embodiment of the present invention.

FIG. 1 is a cross-sectional view of a three-dimensional printing system 10 according to the present preferred embodiment. FIG. 2 is a plan view of the three-dimensional printing system 10. In the drawings, reference characters F, Rr, L, and R indicate front, rear, left, and right, respectively. These directional terms are, however, merely provided for purposes in illustration and are not intended to limit the preferred embodiments of the three-dimensional printing system 10 in any way.

The three-dimensional printing system 10 is a system that can form a target object by attaching and arranging supports on the target object. Hereinafter, the entirety of the target object to which the supports are attached is referred to as a "whole object". The three-dimensional printing system 10 uses data of a plurality of cross-sectional shapes of the whole object. Here, the term "cross-sectional shape" refers to the shape of the cross section of each of the layers when the whole object is divided into a plurality of layers. The three-dimensional printing system 10 forms resin layers having shapes corresponding to the cross-sectional shapes by curing a liquid photocurable resin. Then, the resin layers are stacked successively layer by layer to form the whole object. Note that the term "photocurable resin" refers to a resin that is cured when exposed to light containing a predetermined wavelength.

As illustrated in FIG. 1, the three-dimensional printing system 10 includes a three-dimensional printing apparatus 10A and an arrangement determining apparatus 100 (see FIG. 7) that determines the orientation of the target object and also determining the shape and position arrangement of the supports before forming the whole object with the three-dimensional printing apparatus 10A.

The three-dimensional printing apparatus 10A includes a platform 11, a vat 12, a holder 13, a lighting device 14, and a controller 16.

The platform 11 is supported by a case 25. An opening through which light is allowed to pass is provided in the platform 11. The vat 12 accommodates a liquid photocurable resin 23. The vat 12 is provided on the platform 11. As illustrated in FIG. 2, the vat 12 covers the opening 21 of the platform 11 when provided on the platform 11. The vat 12 is formed of a material capable of transmitting light. For example, the vat 12 is formed of a transparent material.

As illustrated in FIG. 1, the holder 13 is disposed above the vat 12 and above the opening 21 of the platform 11. The holder 13 is configured or programmed to be capable of being raised and lowered. The holder 13 is immersed into the photocurable resin 23 in the vat 12 when it is lowered. When it is raised, the holder 13 lifts the photocurable resin 23 that has been cured by exposure to the light. Herein, the platform 11 is provided with a supporting pillar 41 extending vertically. A slider 42 is mounted in front of the supporting pillar 41. The slider 42 is capable of being raised and lowered along the supporting pillar 41. The slider 42 is moved upward or downward by a motor 43. Herein, the holder 13 is fitted to the slider 42. The holder 13 is moved upward or downward by the motor 43.

The lighting device 14 is disposed below the platform 11. The lighting device 14 applies light having a predetermined wavelength to the photo-curable resin 23 accommodated in the vat 12. The lighting device 14 is accommodated in a case 25 provided below the platform 11. The lighting device 14 includes a projector 31 and a mirror 32. The projector 31 is a light source that emits light. The mirror 32 reflects the light emitted from the projector 31 toward the vat 12. The mirror 32 is disposed below the opening 21 in the platform 11 and behind the projector 31. The light emitted from the projector 31 is reflected by the mirror 32, and is applied through the opening 21 of the platform 11 to the photocurable resin 23 in the vat 12. It should be noted, however, that the arrangement and configuration of the lighting device 14 are not restricted to particular arrangements or configurations.

The controller 16 is connected to the motor 43, which controls the slider 42 fitted with the holder 13 to be raised and lowered, and is connected to the projector 31 of the lighting device 14. The controller 16 is configured or programmed to drive the motor 43 to move the slider 42 and the holder 13 upward or downward. The controller 16 also controls various parameters of the light emitted from the projector 31, such as energy, luminous intensity, light quantity, light wavelength band, light shape, position of the light to be applied, and timing at which light is emitted. It should be noted that the configuration of the controller 16 is not limited to specific configurations. For example, the controller 16 may be a computer, and may include a central processing unit (hereinafter also referred to as "CPU"), a ROM to store programs or the like to be executed by the CPU, and a RAM.

Hereinabove, a configuration of the three-dimensional printing apparatus 10A has been described. As described previously, the three-dimensional printing apparatus 10A forms a whole object where supports are attached on the target object. Next, a description concerning supports will be given below.

When the three-dimensional printing apparatus 10A forms a target object, the holder 13 is raised step by step each time a resin layer is formed, and a new resin layer is formed below the preceding layer. However, if there is a resin layer with a small cross-sectional area, it is possible that the resin layer with a small cross-sectional area may not be able to support the load of all the resin layers positioned therebelow. As a consequence, there is a risk that the target object may break during object formation. In view of this problem, supports are attached and arranged on the target object in order to sufficiently support the load of the target object during object formation. This can prevent the target object from breaking during object formation.

Figure 3:
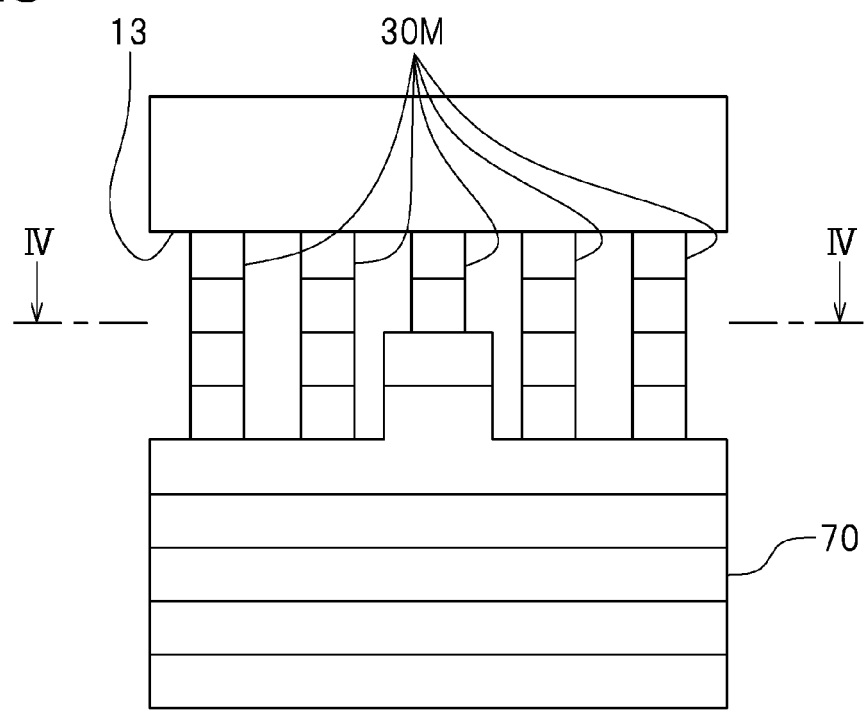
FIG. 3 is a schematic view illustrating how a whole object is formed on the holder.

For example, assuming that the three-dimensional printing apparatus 10A forms a target object directly on the holder 13, the target object is peeled away from the holder 13 after object formation. Then, when the portion of the target object that is in contact with the holder 13 is peeled from the holder 13, the target object may break in some cases. In view of this problem, supports 30M are attached and arranged between the holder 13 and a target object 70 to form the whole object, as illustrated in FIG. 3. Then, after the whole object (an object including the target object 70 and the supports 30M) has been peeled away from the holder 13 subsequent to completion of the object formation, the process of removing the supports 30M from the target object 70 is carried out. This prevents the target object 70 from breaking.

The supports 30M are attached and arranged on the target object 70 by performing a predetermined computation with the controller 16. More specifically, the shape, thickness (i.e., contact area with a target object), and number per unit area of the supports 30M, for example, are specified by the user. The controller 16 attaches and arranges the supports 30M on the target object 70 according to the conditions specified by the user. In the example shown in FIG. 3, the controller 16 attaches and arranges supports 30M having a predetermined thickness (a uniform thickness) on the target object 70. However, the predetermined computation to attach the supports 30M on the target object may be performed by a dedicated device other than the controller 16.

A force that tends to keep balance against the load of the resin layer made of the cured photocurable resin 23 acts on the holder 13. Herein, this force is referred to as "allowable stress" when necessary. The allowable stress T can be calculated, for example, by the following expression (1), where reference stress is ST and safety factor is SF.

$$T = ST/SF \qquad (1)$$

Here, uncertain factors such as variations in strength from material to material or load margin of the resin layer are taken into consideration when setting the safety factor SF.

In the present preferred embodiment, because the holder 13 supports the load L of the resin layer composed of the cured photocurable resin 23, the following expression (2) holds.

$$L < T \quad (2)$$

Also, the allowable stress T can be expressed by the following expression (3), where the load supported per unit area of a single support 30M is S, the area of the single support 30M that is in contact with the target object 70 is A, and the number of the supports 30M is N:

$$T = S \times A \times N / SF \quad (3)$$

By assigning the above expression (3) to the above expression (2), the load L of the resin layer can be expressed by the following expression (4):

$$L < S \times A \times N / SF \quad (4)$$

Figure 4:
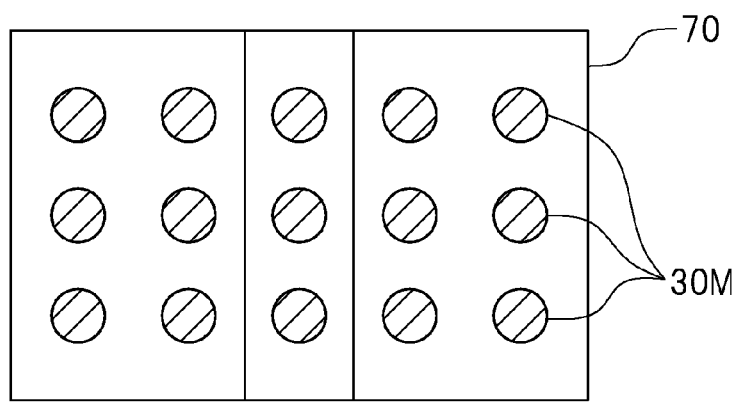
FIG. 4 is a cross-sectional view taken along line IV-IV in FIG. 3.

It should be noted that the shapes of the supports 30M are not limited to specific shapes. FIG. 4 is a cross-sectional view taken along line IV-IV in FIG. 3. In the present preferred embodiment, a plurality of cylindrical columns having the same thickness are used as the supports 30M, as illustrated in FIG. 4. Herein, as illustrated in FIG. 3, the upper end portion of each of the supports 30M is provided on the holder 13, and the lower end portion thereof is provided on the target object 70. It should be noted, however, that the above-described shape and thickness of the supports 30M are merely exemplary. The shape of the supports 30M may be, for example, a triangular or quadrangular shape in cross section. Each of the supports 30M may have a contact area with the target object 70 and a contact area with the holder 14 that are different from each other. For example, in the support 30M, the contact area of the end portion that is in contact with the target object 70 may be smaller than the contact area of the end portion that is in contact with the holder 13. This allows the supports 30M to be easily removed from the target object 70. The plurality of supports 30M may have the same shape, but some of the supports 30M may have a different shape. For convenience in illustration, it is assumed that the plurality of supports 30M have the same thickness, unless otherwise stated. In other words, it is assumed that the plurality of supports 30M have different cross-sectional shapes but the same contact area with the target object 70. The intervals between adjacent supports 30M are not limited to specific intervals. However, the intervals preferably are set to be uniform or substantially uniform herein. In the present preferred embodiment, as illustrated in FIG. 4, the plurality of supports 30M are attached and arranged at regular intervals. The plurality of supports 30M are attached and arranged at positions that are aligned with respect to a left-right direction and a front-rear direction. It should be noted, however, that the above-described position arrangement of the supports 30M is merely exemplary. The intervals between adjacent supports 30M need not be uniform. The plurality of supports 30M may be attached and arranged, for example, in a staggered arrangement.

As described previously, the three-dimensional printing apparatus 10A forms the target object 70 by raising the holder 13 step by step. The target object 70 is formed successively from the top toward the bottom. The three-dimensional printing apparatus 10A receives data of a three-dimensional model (hereinafter referred to as "target object model") of the target object 70, and using the received data, forms a target object 70 having the same or substantially the same shape as that of the target object model.

The orientation of the target object model is determined in advance (which is hereinafter referred to as the "initial orientation"). For example, when the target object model is a decorative object in a conical shape, the initial orientation is determined so that the vertex of the cone is positioned upward and the bottom surface thereof is positioned downward. However, as will be discussed below, it is not always appropriate to form the target object 70 without changing its initial orientation.

Figure 5:
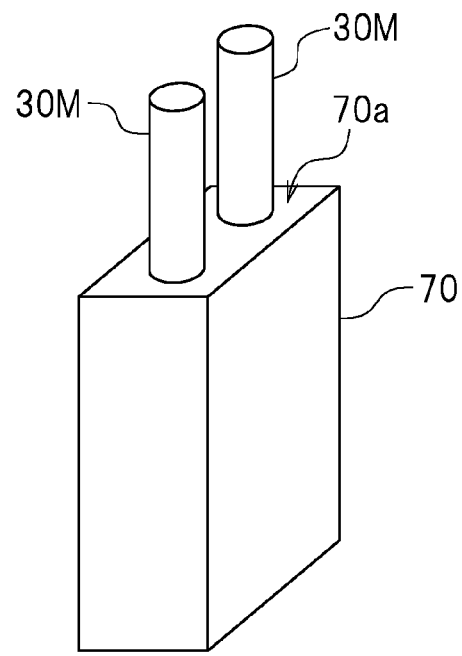
FIG. 5 is a perspective view illustrating one example where supports are attached and arranged on a target object.
Figure 6:
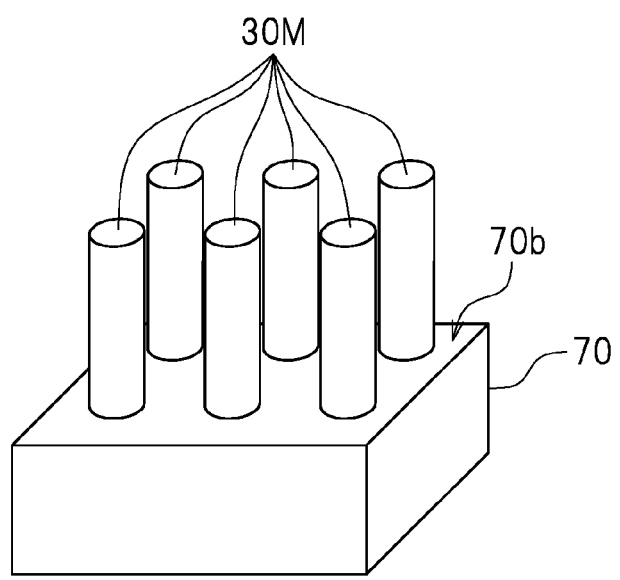
FIG. 6 is a perspective view illustrating one example where supports are attached and arranged on a target object.

Depending on the orientation of the target object 70, there are cases where a sufficient number of supports 30M cannot be attached or arranged because the area of the surface of the target object 70 that faces the holder 13 is too small. For example, when the supports 30M are attached and arranged on the target object 70 in the orientation as shown in FIG. 5, the area of the surface 70a on which the supports 30M are attached and arranged is small. This means that the number of the supports 30M attached and arranged is accordingly small. As a consequence, there is a risk that the supports 30M may not be able to support the load of the target object 70 during object formation. On the other hand, when the supports 30M are attached and arranged on the target object 70 in the orientation as shown in FIG. 6, the area of the surface 70b on which the supports 30M are attached and arranged is larger. This means that the number of the supports 30M attached and arranged is larger than that in the example of FIG. 5. As a result, the supports 30M are able to support the target object 70 more easily. The present inventors have discovered that the supports 30M are able to stably support the load of the target object 70 when the surface of the target object 70 is able to obtain sufficient area for the supports 30M to be attached and arranged on it.

It should be noted that if the number of supports 30M is too small, the supports 30M cannot sufficiently support the load of the target object 70. On the other hand, the supports 30M must be removed from the target object 70 after completion of object formation. This means that if the number of the supports 30M is too large, it takes much time and trouble to remove them from the target object 70. Moreover, the amount of photocurable resin 23 that is consequently wasted becomes larger. From these viewpoints, it is preferable that the number of supports 30M be significantly reduced or minimized so that the contact area per unit area between the supports 30M and the target object 70 is significantly reduced or minimized. The present inventors have studied on which surface of the target object 70 and in what way the supports 30M should be attached and arranged in order to reduce the amount of the photocurable resin 23 used for the supports 30M, based on the premise that the supports 30M are able to support the load of the target object 70.

The present inventors have paid special attention to the center of gravity of the target object 70. At the center of gravity of the target object 70, the bending moment becomes zero. Thus, the present inventors have discovered that the supports 30M are able to stably support the load of the target object 70 by attaching and arranging the supports 30M in a region of a surface of the target object 70 that is positioned near the center of gravity of the target object 70. The present inventors have also discovered that even when the number of the supports 30M is made less in a region of a surface of the target object 70 that is positioned away from the center of gravity of the target object 70 than that in the region of the surface of the target object 70 that is positioned near the center of gravity thereof, the supports 30M are able to support the load of the target object 70.

Conventionally, the determination as to on which surface of the target object 70 and in what shape the supports 30M should be attached has often been made according to empirical rules developed by the user. For this reason, depending on the user, the allowable stress of the supports 30M may not be set to be sufficient to support the load of the target object 70. In view of this problem, the present preferred embodiment allows the arrangement determining apparatus 100 to determine the shape, thickness, and position arrangement of the supports 30M such that the allowable stress of the supports 30M is able to sufficiently support the load of the target object 70.

Figure 7:
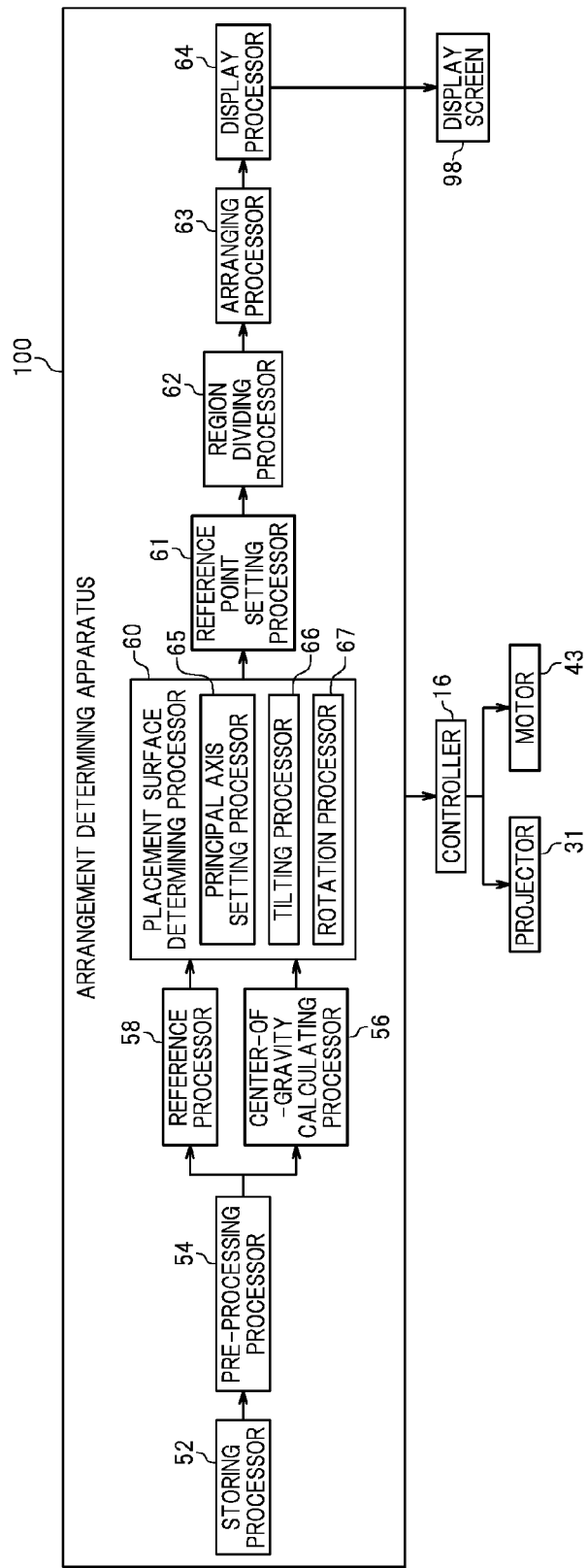
FIG. 7 is a block diagram illustrating an arrangement determining apparatus.

FIG. 7 is a block diagram illustrating the arrangement determining apparatus 100. The arrangement determining apparatus 100 may be either a separate apparatus from the three-dimensional printing apparatus 10A or may be integrated in the three-dimensional printing apparatus 10A. For example, the arrangement determining apparatus 100 may be a computer, and may include a CPU, a ROM to store programs or the like to be executed by the CPU, a RAM, and so forth. Herein, a program stored in the computer is used to determine the position arrangement of the supports. The arrangement determining apparatus 100 may be either a dedicated computer designed for the three-dimensional printing system 10 or a general-purpose computer.

The arrangement determining apparatus 100 includes a storing processor 52, a pre-processing processor 54, a center-of-gravity calculating processor 56, a reference processor 58, a placement surface determining processor 60, a reference point setting processor 61, a region dividing processor 62, an arranging processor 63, and a display processor 64. The placement surface determining processor 60 includes a principal axis setting processor 65, a tilting processor 66, and a rotation processor 67. Each of the processors is achieved by executing a computer program (hereinafter referred to as "program") stored in the arrangement determining apparatus 100.

Figure 8:
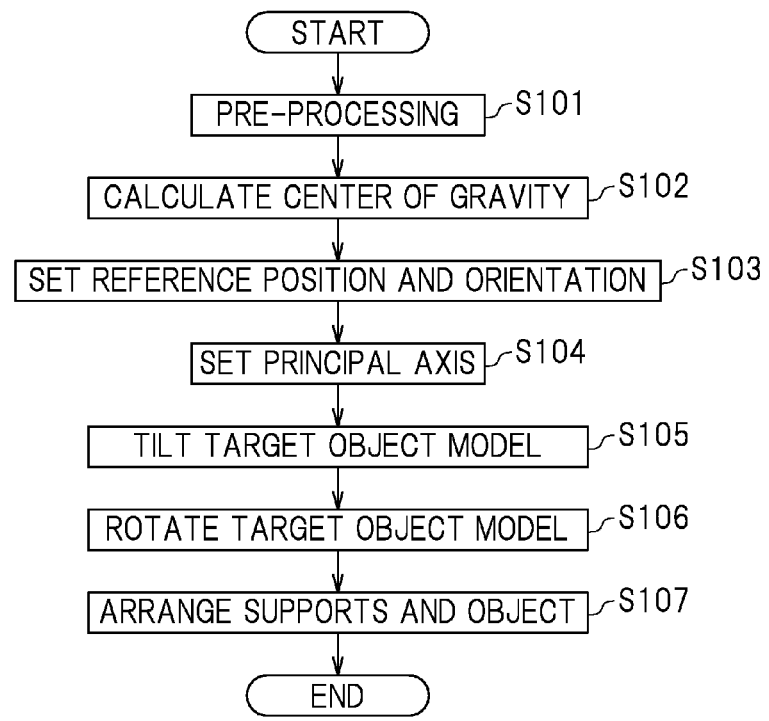
FIG. 8 is a flowchart illustrating a procedure of determining on which surface of the target object model the supports should be attached and arranged.
Figure 9:
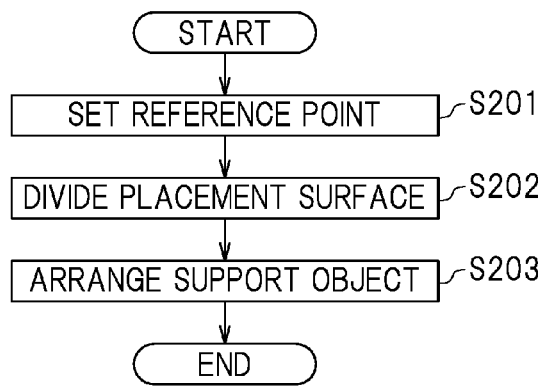
FIG. 9 is a flowchart illustrating a procedure of determining the shape, thickness, and position arrangement of the supports.
Figure 10:
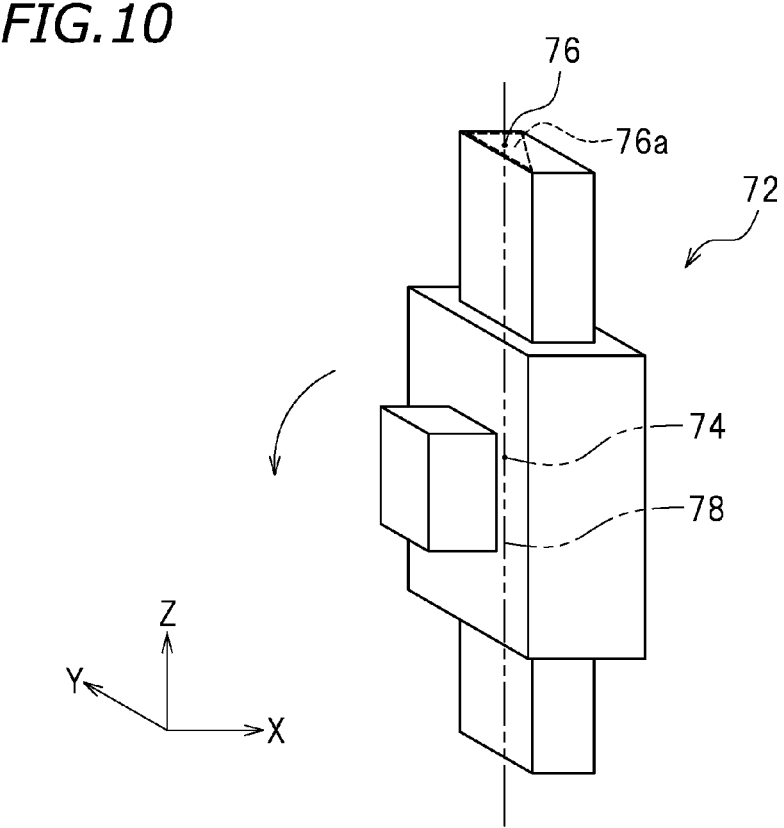
FIG. 10 is a perspective view illustrating one example of a target object model.
Figure 11:
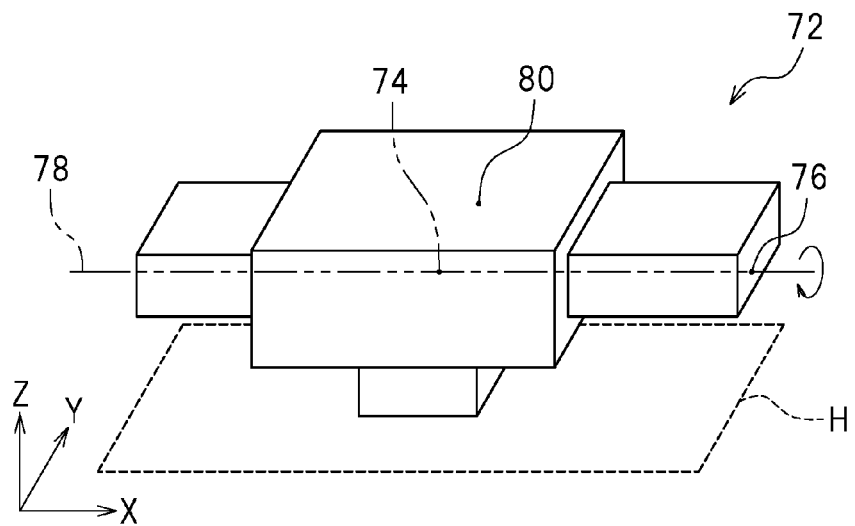
FIG. 11 is a perspective view illustrating one example of a target object model that has been tilted.
Figure 12:
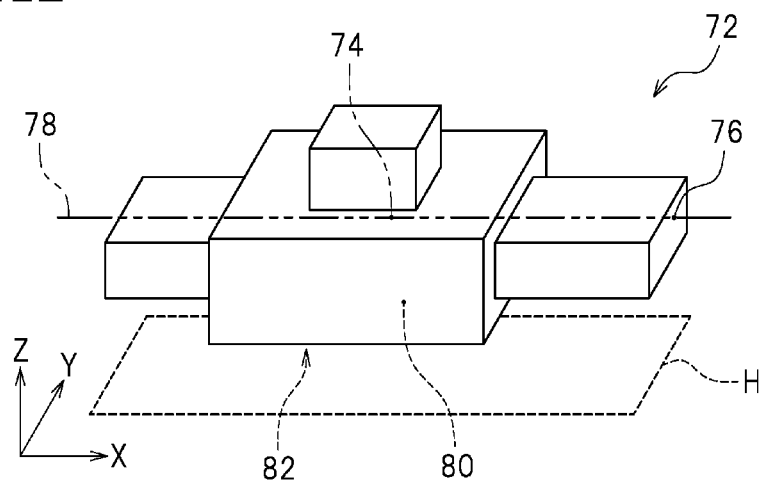
FIG. 12 is a perspective view illustrating one example of a target object model that has been rotated.

FIG. 8 is a flowchart illustrating a procedure of determining on which surface of a target object model 72 supports 30 should be attached and arranged. FIG. 9 is a flowchart illustrating a procedure to determine the shape, thickness, and position arrangement of the supports 30. FIGS. 10 to 12 are perspective views of the target object model 72. Herein, using the target object model 72 shown in FIGS. 10 to 12, the procedure of determining which surface of the target object model 72, which is a three-dimensional model of the target object 70, should be attached and arranged with the supports 30 will be described first with reference to the flow-chart of FIG. 8. Next, the procedure of determining the shape, thickness, and position arrangement of the supports 30 will be described with reference to the flow-chart of FIG. 9. Herein, the supports 30 are attached and arranged on the bottom surface of the target object model 72.

Herein, the storing processor 52 of the arrangement determining apparatus 100 stores data of the target object model 72 that corresponds to the target object 70 in advance. The data of the target object model 72 are read from a recording medium or another computer (not shown) into the storing processor 52 by, for example, a user action. The data of the target object model 72 are, for example, data identified by a set of a plurality of points in an XYZ perpendicular or substantially perpendicular coordinate system, and are three-dimensional data. For example, the target object model 72 reproduces the target object 70 by combining a plurality of triangular polygons or triangular pyramid elements.

First, at step S101, the pre-processing processor 54 performs a pre-process on the target object model 72 stored in the storing processor 52. The target object model 72 is, in many cases, detail data that faithfully reproduce the three-dimensional shape of the target object 70. If the target object model 72 are used as it is, it may take a long time to perform the arrangement determining process with the arrangement determining apparatus 100. For this reason, it is preferable that the pre-processing processor 54 perform a pre-process on the target object model 72 to reduce the amount of data of the target object model 72. Herein, the pre-processing processor 54 performs a smoothing process on the target object model 72. For example, the smoothing process is desirably a process of reducing the number of the triangular polygons that form the target object model 72 to reduce the amount of the data. The method of smoothing process is not limited, and any conventionally known method of smoothing process may be used. For example, a Gaussian function may be used as a method of smoothing process. The data of the target object model 72 that have been subjected to the smoothing process are stored in the storing processor 52. Note that the pre-processing at step S101 may be eliminated.

Next, at step S102, the center-of-gravity calculating processor 56 calculates the center of gravity of the target object model 72. Herein, it is possible to use any conventionally known technique to calculate the center of gravity of the target object model 72. For example, the center of gravity of the target object model 72 can be calculated by, for example, utilizing the centers of gravity of the triangular pyramid elements that form the target object model 72. Note that in FIG. 10, the center of gravity of the target object model 72 is at a point 74.

For example, the center-of-gravity calculating processor 56 can calculate the center of gravity 74 of the target object model 72 in the following manner. For example, it is assumed that the target object model 72 is constructed by combining a plurality of triangular pyramid elements A1, A2, ..., An. Here, the center-of-gravity calculating processor 56 calculates the volume Vall of the target object model 72 first. Next, the center-of-gravity calculating processor 56 calculates the respective centers of gravity G1, G2, ..., Gn of the triangular pyramid elements A1, A2, ..., An, and the respective volumes V1, V2, ..., Vn of the triangular pyramid elements A1, A2, ..., An. Then, the center of gravity 74 of the target object model 72 can be calculated by the following expression (5):

Center of gravity 74=($V1 \times G1 + V2 \times G2 + \ldots + Vn \times Gn$)/$Vall$     (5)

Next, at step S103, the reference processor 58 determines the reference position and orientation of the target object model 72. In the present preferred embodiment, the position and orientation of the target object model 72 are identified by three-axis rectangular coordinates. However, it is also possible to identify the position and orientation of the target object model 72 using other coordinate systems. For example, the reference processor 58 sets the reference position so that the center of gravity 74 of the target object model 72 calculated at step S102 is brought into agreement with the central position of the holder 13 (see FIG. 1), when viewed in a plan view. The reference orientation of the target object model 72 is, for example, the orientation at the time of creating the target object model 72. The reference position and orientation of the target object model 72 are, however, not limited.

Next, at steps S104 to S106, the placement surface determining processor 60 determines a placement surface of the target object model 72, on which the supports 30 are attached and arranged. Herein, the placement surface of the target object model 72 is determined by the principal axis setting processor 65, the tilting processor 66, and the rotation processor 67, which are provided in the placement surface determining processor 60. Specifically, the details are as follows.

At step S104, the principal axis setting processor 65 sets the principal axis of the target object model 72. Herein, the term "principal axis" refers to the line that connects the center of gravity 74 of the target object model 72, which is calculated by the center-of-gravity calculating processor 56, with the most distant center of gravity (hereinafter referred to as the "farthest point") from the center of gravity 74 among the centers of gravity of triangular polygons that are points on the outer circumferential surfaces of the target object model 72. For example, the principal axis of the target object model 72 may be set in the following manner. First, the principal axis setting processor 65 calculates the respective distances between the center of gravity 74 of the target object model 72 and the centers of gravity of the triangular polygons that form the target object model 72. Here, the centers of gravity of the polygons that have been calculated at step S102 may be used for the centers of gravity of the triangular polygons that form the target object model 72. Then, the principal axis setting processor 65 obtains the center of gravity of the triangular polygon corresponding to the greatest one of the distances calculated above. In the target object model 72 shown in FIG. 10, the most distant triangular polygon from the center of gravity 74 of the target object model 72 is the polygon 76a, and the farthest point is the center of gravity 76 of the polygon 76a. Herein, the principal axis setting processor 65 sets the linear line passing through the center of gravity 74 of the target object model 72 and the farthest point 76 to be a principal axis 78. It should be noted that, strictly speaking, the center of gravity 76 of the polygon 76a is not necessarily the farthest point that is most distant from the center of gravity of the target object model 72. The reason is that the polygon 76a is a plane having a certain area around the center of gravity 76. However, because the polygon 76a usually has a sufficiently small area relative to the surface area of the target object model 72, the center of gravity 76 may be regarded as the farthest point.

Next, at step S105, the tilting processor 66 tilts the target object model 72 that has been set in the reference position and orientation so that the principal axis 78 of the target object model 72 is parallel or substantially parallel to the horizontal plane H, as shown in FIG. 11. Herein, the horizontal plane H is a plane on which the target object 70 is to be formed, in other words, the bottom surface of the holder 13 (i.e., the surface thereof facing the target object 70). Therefore, tilting processor 66 tilts the target object model 72 that has been set in the reference position and orientation so that the principal axis 78 of the target object model 72 is parallel or substantially parallel to the bottom surface of the holder 13. The target object model 72 that has been tilted is stored in the storing processor 52.

At step S106, the rotation processor 67 rotates the target object model 72. Thereafter, the placement surface determining processor 60 determines the surface of the target object model 72 on which the supports 30 are attached and arranged as a placement surface. Herein, the term "placement surface" means a surface of projection of the target object model 72 to the horizontal plane H (i.e., the holder 13). In other words, the term "placement surface" means a surface of the target object model 72 that is visible when the target object model 72 is viewed in a vertical direction from the horizontal plane H. In the present preferred embodiment, the placement surface can be set in the following manner. Herein, the rotation processor 67 first obtains a nearest point that is the closest point to the center of gravity 74 of the target object model 72 among the points on the outer circumferential surfaces of the target object model 72 tilted by the tilting processor 66. In FIG. 11, the nearest point is the point 80 that is positioned on the top surface of the target object model 72. Then, the rotation processor 67 rotates the target object model 72 around the principal axis 78 so that, when viewed in a plan view, the nearest point 80 is located at a position overlapping the principal axis 78 and also downward relative to the principal axis 78. Herein, the rotation processor 67 rotates the target object model 72 around the principal axis 78 so that the nearest point 80 is brought into the closet position to the horizontal plane H, that is, a surface of the holder 13. The nearest point 80 is positioned on the bottom surface of the target object model 72 that has been rotated. The placement surface determining processor 60 determines a bottom surface of the target object model 72 that has been rotated, to be the placement surface. FIG. 12 is a view illustrating the target object model 72 that has been rotated. In FIG. 12, the placement surface is a surface 82. Herein, the nearest point 80 is positioned on the placement surface 82. The target object model 72 that has been rotated is stored in the storing processor 52.

Next, step S107 determines the positions at which the supports 30 are attached and arranged, and the shape and thickness of the supports 30, for the target object model 72. Herein, the target object 70 is formed step by step from the bottom surface, in the orientation of the target object model 72 that has been set at step S106. The determination of the shape, thickness, and position arrangement of the supports is performed according to the procedures of steps S201 to S203 shown in FIG. 9.

Figure 13:
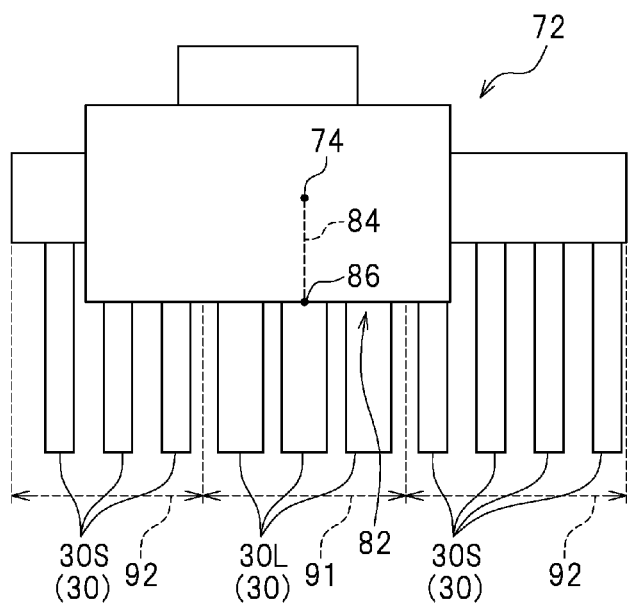
FIG. 13 is a front view of a target object model, which illustrates the rotated target object model on which supports are attached and arranged.
Figure 14:
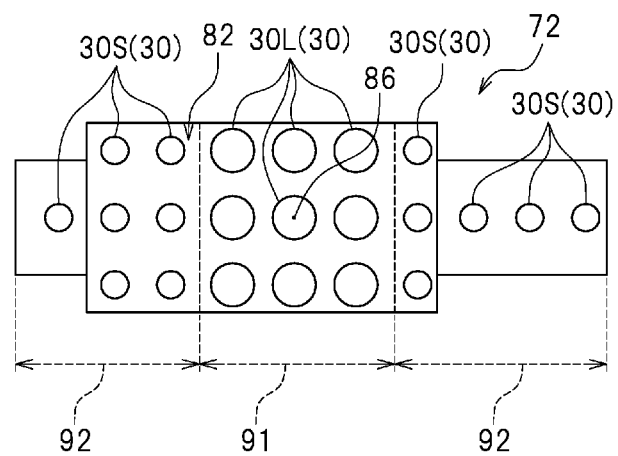
FIG. 14 is a bottom view of the target object model, which illustrates the rotated target object model on which supports are attached and arranged.

FIG. 13 is a front view of a target object model 72, which illustrates the rotated target object model 72 (FIG. 12) on which supports 30 are attached and arranged. FIG. 14 is a bottom view of the target object model 72, which illustrates the rotated target object model 72 (FIG. 12) on which the supports 30 are attached and arranged. First, at step S201, the reference point setting processor 61 sets a reference point 86, as illustrated in FIG. 13. The term "reference point" means a point that is on the placement surface 82 and serves as reference when dividing the placement surface 82. Herein, the reference point can be set in the following manner. First, the reference point setting processor 61 draws a perpendicular line from the center of gravity 74 of the target object model 72, calculated by the center-of-gravity calculating processor 56, toward the placement surface 82. The perpendicular line 84 is a line perpendicular or substantially perpendicular to the placement surface 82. The, the reference point setting processor 61 sets the intersection point of the perpendicular line 84 and the placement surface 82 as the reference point 86. Herein, the reference point 86 is a point that overlaps the center of gravity 74 of the target object model 72 when viewed in a bottom view. The reference point 86 is the closest point to the center of gravity 74 among the points on the placement surface 82. In the present preferred embodiment, the reference point 86 is in agreement with the nearest point 80 (see FIG. 12).

Next, at step S202, the region dividing processor 62 divides the placement surface 82 into a plurality of regions. Herein, the region dividing processor 62 divides the placement surface 82 into a first region 91 and a second region 92 using the reference point 86 set in the step S201 as a reference. The first region 91 is a region that is close to the center of gravity 74 of the target object model 72. The first region 91 is a region that is within a predetermined area containing the reference point 86. The predetermined area containing the reference point 86 is an area that is stored in the arrangement determining apparatus 100 in advance. The predetermined area containing the reference point 86 is not limited, and may be an area centering around the reference point 86 that is a predetermined distance away therefrom. For example, the predetermined distance is a distance such that the first region 91 contains a predetermined proportion of the load of the target object model 72. The predetermined distance is a numerical value that is determined in the arrangement determining apparatus 100. Herein, as illustrated in FIG. 14, the reference point 86 is positioned at the center of the first region 91. The center of the first region 91 is a point that is positioned at the center of the region. The center of the first region 91 may be obtained using a conventionally known method. The position of the reference point 86 in the first region 91 is not limited in any way. For example, the reference point 86 may be positioned at an end of the first region 91.

The second region 92 is a region of the placement surface 82 that excludes the first region 91. The second region 92 is a region that is more distant from the center of gravity 74 of the target object model 72 than the first region 91.

Next, at step S203, the arranging processor 63 attaches and arranges the supports 30 in the first region 91 and the second region 92, which have been divided by the region dividing processor 62. More specifically, the arranging processor 63 attaches and arranges the supports 30 on the placement surface 82 so that the contact area per unit area between the first region 91 and the supports 30 that are attached and arranged in the first region 91 is larger than the contact area per unit area between the second region 92 and the supports 30 that are attached and arranged in the second region 92. In the present preferred embodiment, the thickness, i.e., the cross-sectional area, of the supports 30 is different between the supports 30 that are attached and arranged in the first region 91 and those attached and arranged in the second region 92. Herein, when the cross-sectional shape of the supports 30 is circular, as illustrated in FIG. 14, the term "thickness" of the supports 30 refers to the diameter thereof. When the cross-sectional shape of the supports 30 is other than circular, for example, a rectangular shape, the term "thickness" of the supports 30 refers to the equivalent diameter thereof. In the following description, the support 30 that is attached and arranged in the first region 91 is referred to as a "first support 30L". The support 30 that is attached and arranged in the second region 92 is referred to as a "second support 30S". Herein, the thickness of the first support 30L is greater than the thickness of the second support 30S. In other words, the cross-sectional area of the first support 30L is larger than the cross-sectional area of the second support 30S. The contact area between the first support 30L and the target object 70 is larger than the contact area between the second support 30S and the target object 70. Herein, the arranging processor 63 arranges a plurality of first supports 30L in the first region 91. The arranging processor 63 also arranges a plurality of second supports 30S in the second region 92.

The arranging processor 63 arranges one of the plurality of first supports 30L on the reference point 86 contained in the first region 91. It is also possible, however, that no first support 30L be attached and arranged on the reference point 86. The position arrangement of the first supports 30L except the first support 30L attached and arranged on the reference point 86 is not limited. For example, the arranging processor 63 may attach and arrange the first supports 30L so that a plurality of first supports 30L are arranged at regular intervals in the first region 91, as shown in FIG. 14. The phrase "regular intervals" herein is meant to include the cases where the supports are arranged substantially at regular intervals, albeit with slight variations in intervals, in addition to the cases where the supports are arranged at strictly regular intervals. It is also possible, however, that the intervals between the plurality of first supports 30L are varied.

The position arrangement of the second supports 30S attached and arranged in the second region 92 is not limited either. For example, the arranging processor 63 may attach and arrange the second supports 30S so that a plurality of second supports 30S are arranged at regular intervals in the second region 92. It is also possible that the arranging processor 63 may attach and arrange the second supports 30S so that a plurality of second supports 30S are arranged at varying intervals from each other. Herein, the intervals between the plurality of second supports 30S preferably are regular intervals.

In the manner as described above, the arranging processor 63 attaches and arranges the first supports 30L and the second supports 30S on the placement surface 82 so that the contact area per unit area between the first region 91 and the first supports 30L is larger than the contact area per unit area between the second region 92 and the second supports 30S, which are thinner than the first supports 30L.

In the present preferred embodiment, it is also possible that the arrangement determining apparatus 100 may be provided with a preview function to display the target object model 72 on which the supports 30 are attached and arranged, before object formation. When this is the case, the arrangement determining apparatus 100 includes a display screen 98 and a display processor 64, as illustrated in FIG. 7. The display screen 98 displays a target object model 72 on which the supports 30 are attached and arranged by the arranging processor 63 (such a target object model is hereinafter referred to as a "whole object model"). The display processor 64 causes the display screen 98 to display the whole object model.

The display processor 64 may cause the display screen 98 to display either only one whole object model or a plurality of whole object models. For example, when the display screen 98 displays only one whole object model, the user can view the displayed whole object model to check the shape and position arrangement of the supports 30 in advance.

When a plurality of whole object models are to be displayed on the display screen 98, the arrangement determining apparatus 100 prepares a plurality of whole object models including different placement surfaces, i.e., a plurality of whole object models on which the supports are attached and arranged on different surfaces. Then, the display processor 64 causes the display screen 98 to display the plurality of whole object models. The user can select one of the plurality of whole object models that the user believes to be the best.

The arrangement determining apparatus 100 may have an editing function to allow the user to edit the selected whole object model. For example, the arrangement determining apparatus 100 may have a function to zoom in or out of a portion of the whole object model. This enables the user to check the condition of the supports which are attached and arranged in more detail. Thus, because the user is able to edit the selected whole object model, the user is able to obtain an optimum whole object model that the user believes to be the best more easily.

The three-dimensional printing apparatus 10A forms the target object 70 and the supports 30 with the orientation of the target object 70 as well as the shape, thickness, and position arrangement of the supports 30 in accordance with the selected whole object model. Specifically, the supports 30 and the target object 70 are formed below the holder 13. More specifically, the supports 30 are formed below the holder 13, and the target object 70 is formed below the supports 30 step by step, from the bottom surface toward the top surface.

Because the arrangement determining apparatus 100 is provided with the preview function, the user is allowed to perceive what size of supports 30 are attached and arranged on which surface of the target object 70 in what way, in advance of object formation of the target object 70. If the user judges that there is a risk of breakage of the target object 70 when it is formed according to the displayed whole object model, the user may stop object formation of the target object 70 according to the displayed whole object model. This prevents breakage of the target object 70 during object formation.

In the present preferred embodiment, the region dividing processor 62 divides the placement surface 82 determined by the placement surface determining processor 60 into the first region 91, which is within a predetermined area and contains the reference point 86 set by the reference point setting processor 61, and the second region 92, which excludes the first region 91. The arranging processor 63 attaches and arranges the supports 30 (i.e., the first supports 30L and the second supports 30S) on the placement surface 82 so that, in the first region 91 and the second region 92, the contact area per unit area between the first supports 30L and the first region 91 is larger than the contact area per unit area between the second supports 30S and the second region 92. Thus, the first region 91 is set at a position closer to the center of gravity 74 of the target object model 72 than is the second region 92. As a result, the supports 30 are able to support the load of the target object 70 around the center of gravity 74 of the target object 70 that corresponds to the target object model 72. This reduces the bending moment to the load of the target object 70. Therefore, the supports 30 are able to stably support the load of the target object 70, and the supports 30 are able to be attached and arranged optimally.

According to the present preferred embodiment, the contact area per unit area between the first region 91 and the first supports 30L preferably is set larger than the contact area per unit area between the second region 92 and the second supports 30S, as described above. This reduces the amount of the resin material used for the supports 30 in comparison with, for example, the case where the first supports 30L, which are thicker than the second support 30S, are attached and arranged on the entire placement surface 82. Therefore, the present preferred embodiment is advantageous in terms of cost reduction.

In the present preferred embodiment, the arranging processor 63 attaches and arranges the first supports 30L having a first thickness in the first region 91 and the second supports 30S having a second thickness in the second region 92, the second thickness being less than the first thickness. This enables the thicker supports 30L to be attached and arranged near the center of gravity 74 of the target object model 72. As a result, the supports 30 are able to stably support the load of the target object 70.

In the present preferred embodiment, the arranging processor 63 attaches and arranges one of the first supports 30L on the reference point 86 of the placement surface 82. As illustrated in FIG. 13, the reference point 86 is in agreement with the nearest point 80 (see FIG. 12) in the present preferred embodiment, as described previously. In other words, the reference point 86 is the closest point to the center of gravity 74 among the points on the placement surface 82. Thus, the supports 30 are able to support the load of the target object 70 more stably by attaching and arranging one of the first supports 30L on the reference point 86.

In the present preferred embodiment, the region dividing processor 62 divides the placement surface 82 into the first region 91 and the second region 92 so that the reference point 86 is disposed at the center of the first region 91. This allows the first region 91 to be a region centering around the reference point 86, which is the closest point to the center of gravity 74. As a result, the supports 30 are able to more stably support the load of the target object 70.

Hereinabove, the three-dimensional printing system 10 equipped with the arrangement determining apparatus 100 has been described according to the first preferred embodiment. The arrangement determining apparatus according to the present invention is not limited to the arrangement determining apparatus 100 according to the first preferred embodiment, but may be embodied in various other forms of preferred embodiments. Next, other preferred embodiments will be described briefly. In the following description, the same features, elements and steps as in the first preferred embodiment are designated by the same reference characters, and a further description thereof will be omitted.

Second Preferred Embodiment

Figure 15:
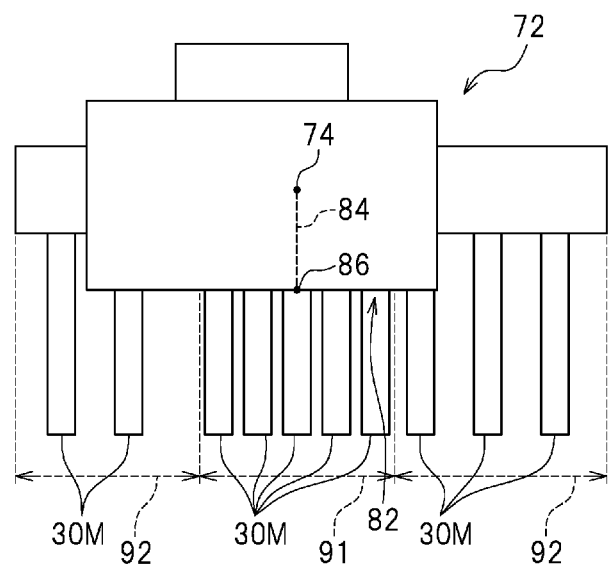
FIG. 15 is a front view of a target object model, which illustrates the target object model on which supports are attached and arranged.
Figure 16:
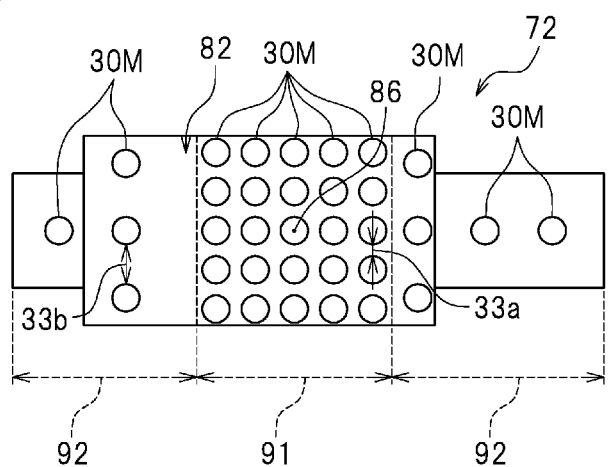
FIG. 16 is a bottom view of the target object model, which illustrates the target object model on which supports are attached and arranged.

FIG. 15 is a front view of a target object model 72, which illustrates the target object model 72 on which supports 30M are attached and arranged. FIG. 16 is a bottom view of the target object model 72, which illustrates the target object model 72 on which the supports 30M are attached and arranged.

In the present preferred embodiment, the supports 30M attached and arranged in the first region 91 and the supports 30M attached and arranged in the second region 92 preferably have the same shape and thickness (i.e., cross-sectional area). The arranging processor 63 of the arrangement determining apparatus 100 attaches and arranges the supports 30M on the placement surface 82 so that the number of supports 30M per unit area that are attached and arranged in the first region 91 is larger than the number of supports 30M per unit area that are attached and arranged in the second region 92. Herein, the interval 33a between the plurality of supports 30M attached and arranged in the first region 91 preferably is narrower than the interval 33b between the plurality of supports 30M attached and arranged in the second region 92. The density of the plurality of supports 30M attached and arranged in the first region 91 is higher than the density of the plurality of supports 30M attached and arranged in the second region 92.

As illustrated in FIG. 15, the plurality of supports 30M are attached and arranged in the first region 91 preferably at regular intervals. It is also possible, however, that the plurality of supports 30M may be attached and arranged in the first region 91 at varying intervals. Likewise, the plurality of supports 30M are attached and arranged in the second region 92 preferably at regular intervals, but it is also possible that the intervals between the plurality of supports 30M may be attached and arranged in the second region 92 at varying intervals.

Herein, a support 30M is attached and arranged on the reference point 86, which is arranged in the first region 91. However, the support 30M may not be attached and arranged on the reference point 86.

In the present preferred embodiment as well, the contact area per unit area between the supports 30M and the first region 91 is larger than the contact area per unit area between the supports 30M and the second region 92, as in the first preferred embodiment. As a result, the present preferred embodiment allows a larger number of the supports 30M to be attached and arranged near the center of gravity 74 of the target object model 72. As a result, the supports 30M are able to stably support the load of the target object 70.

Third Preferred Embodiment

Figure 17:
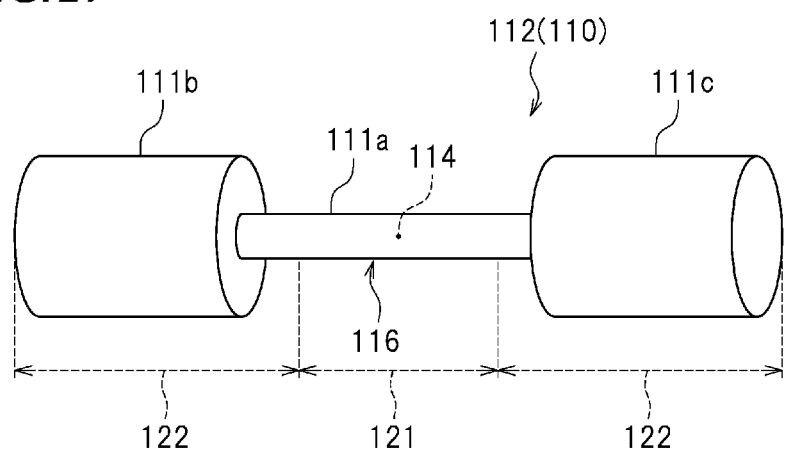
FIG. 17 is a view illustrating one example of a target object model of a target object, which illustrates a perspective view of the target object model.

Next, an arrangement determining apparatus according to a third preferred embodiment of the present invention will be described. FIG. 17 is a perspective view illustrating one example of a target object model 112 of a target object 110. As illustrated in FIG. 17, the target object 110 preferably has a dumbbell shape, which combines together a first partial object 111a with a rod shape, a second partial object 111b with a cylindrical columnar shape that is disposed at one end of the first partial object 111a, and a third partial object 111c with a cylindrical columnar shape that is disposed at the other end of the first partial object 111a. In the target object 110, the center of gravity is at a center of gravity 114 shown in FIG. 17. Herein, a placement surface 116 of the target object model 112 on which the supports 30 are attached and arranged is set to be a bottom surface of the target object model 112. As in the foregoing preferred embodiments, a first region 121 is set near the center of gravity 114, and a second region 122 is set at a position away from the center of gravity 114. In this case, for example, the arranging processor 63 attaches and arranges the supports 30 (i.e., the first supports 30L and the second supports 30S) on a placement surface 116 so that the contact area per unit area between the first supports 30L and the first region 121 is larger than the contact area per unit area between the second supports 30S and the second region 122, as in the first preferred embodiment. At that time, the thicker first supports 30L are attached and arranged on the first partial object 111a, although the load of the first partial object 111a is lower than the load of the second partial object 111b and the third partial object 111c. It is preferable, however, that in the target object model 112, the thicker first supports 30L be attached and arranged on the second partial object 111b and the third partial object 111c, which have a higher load.

For example, when supports 30M having the same thickness (see FIG. 15) are attached and arranged on the target object 110 as in the second preferred embodiment, a larger number of supports 30M are attached and arranged on the first partial object 111a, even though the load of the first partial object 111a is lower than the load of the second partial object 111b and the third partial object 111c. However, it is preferable that in the target object model 112, a larger number of supports 30M be attached and arranged on the second partial object 111b and the third partial object 111c, which have a higher load.

For that reason, when the target object is such a target object 110 as described above, it is preferable to divide the target object model 112 into the partial objects 111a, 111b, and 111c and determine the shapes and position arrangements of supports 30 respectively for the partial objects 111a, 111b, and 111c. The method of dividing the target object model 112 is not limited in any way. For example, the target object model 112 may be displayed on the display screen 98 (see FIG. 7) and the user may determine in what way the target object model 112 should be divided while viewing the display screen 98. Herein, the target object model 112 is divided into three partial objects, but the number of partial objects to be divided is not limited thereto. For example, the target object model 112 may be divided into two partial objects, or may be divided into four or more partial objects. The arrangement determining apparatus of the present preferred embodiment calculates respective centers of gravity of the partial objects 111a, 111b, and 111c and thereafter sets reference points. Specifically, the details are as follows.

Figure 18:
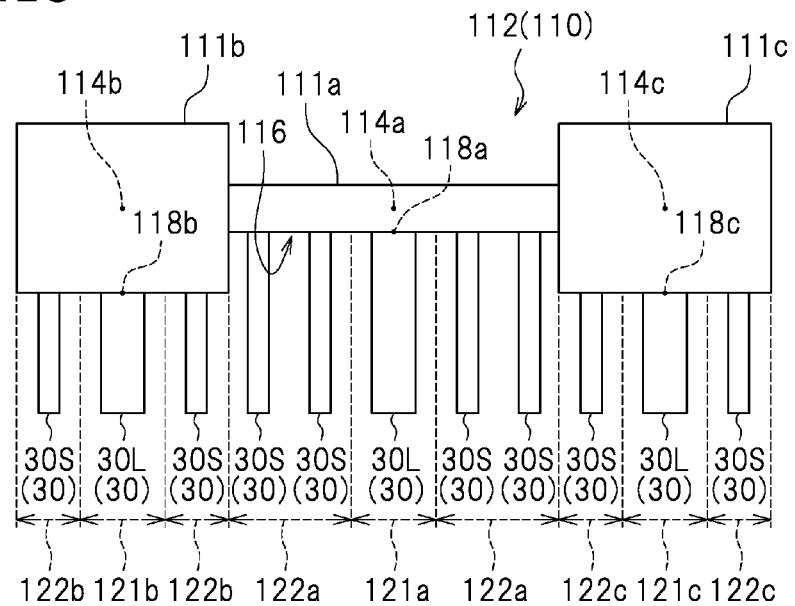
FIG. 18 is a front view of a target object model, which illustrates the target object model on which supports are attached and arranged.
Figure 19:
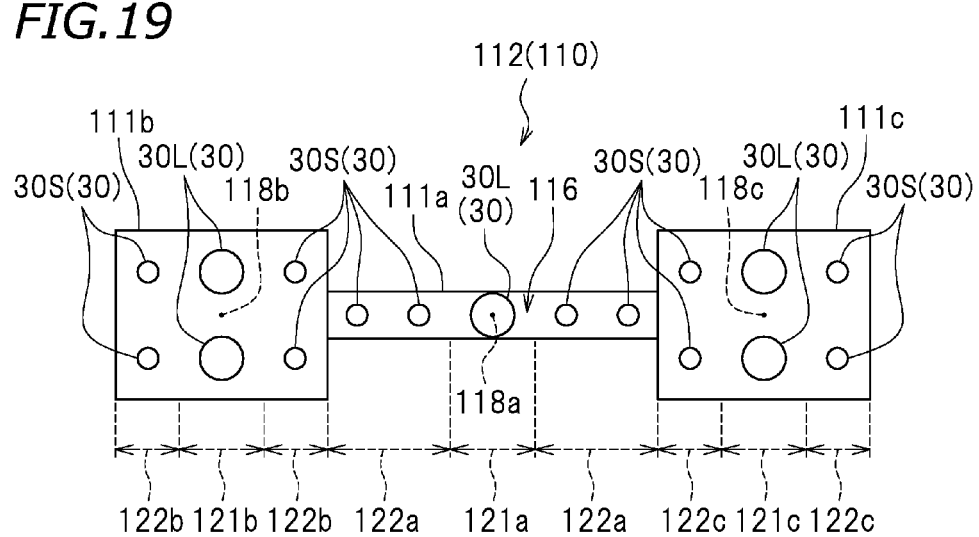
FIG. 19 is a bottom view of the target object model, which illustrates the target object model on which supports are attached and arranged.

FIG. 18 is a front view of the target object model 112. FIG. 19 is a bottom view of the target object model 112. FIGS. 18 and 19 illustrate the target object model 112 on which supports 30 are attached and arranged. Herein, first support 30L, and second supports 30S that are thinner than the first support 30L are attached and arranged on the target object model 112. As illustrated in FIG. 18, the placement surface 116 on which the supports 30 are attached and arranged is determined among the surfaces of the target object model 112. Herein, the placement surface 116 is determined in the same procedure as described in the foregoing preferred embodiments. Next, the arrangement determining apparatus divides a target object model 110, which corresponds to the target object model 112, into partial objects 111a, 111b, and 111c. Then, the arrangement determining apparatus calculates the respective centers of gravity 114a, 114b, and 114c of the partial objects 111a, 111b, and 111c. Then, the arrangement determining apparatus sets respective reference points 118a, 118b, and 118c of the partial objects 111a, 111b, and 111c. Then, the arrangement determining apparatus sets first regions 121a, 121b, and 121c and second regions 122a, 122b, and 122c which contains the respective reference points, for the respective partial objects 111a, 111b, and 111c.

Thereafter, in the first partial object 111a, the supports 30 (i.e., the first supports 30L and the second supports 30S) are attached and arranged in the first region 121a and the second region 122a so that the contact area per unit area between the first supports 30L and the first region 121a is larger than the contact area per unit area between the second supports 30S and the second region 122a. In a similar manner, the first supports 30L and the second supports 30S are attached and arranged in the first region 121b and the second region 122b of the second partial object 111b as well as in the first region 121c and the second region 122c of the third partial object 111c. In the present preferred embodiment, the thickness of the first support 30L is greater than the thickness of the second support 30S.

As described above, when the target object model 112 is such a target object model 112 as shown in FIG. 17, it is preferable to divide the target object model 112 into partial objects 111a, 111b, and 111c and regard each of the partial objects 111a, 111b, and 111c as a single object to attach and arrange the supports 30. In such a case as well, the first regions 121a, 121b, and 121c, which contain the respective reference points positioned near the respective centers of gravity 114a, 114b, and 114c of the partial objects 111a, 111b, and 111c, are able to be attached and arranged with the first supports 30L, which are thicker than the second supports 30S attached and arranged in the second regions 122a, 122b, and 122c, which are distant from the reference points.

As a result, even in the target object 110 as shown in FIG. 17, the supports 30 can stably support the load of the target object 110.

When it is desired to attach supports 30M having the same thickness (see FIG. 15) on the target object model 112, for example, it is carried out in the following manner. In the first partial object 111a, the supports 30M are attached and arranged in the first region 121a and the second region 122a so that the number of the supports 30M attached and arranged in the first region 121a is larger than the number of the supports 30M attached and arranged in the second region 122a. In a similar manner, the supports 30M are attached and arranged in the first region 121b and the second region 122b of the second partial object 111b as well as in the first region 121c and the second region 122c of the third partial object 111c.

Thus, in the case of attaching the supports 30M having the same thickness as well, a larger number of supports 30M are able to be attached and arranged in the first regions 121a, 121b, and 121c, which are positioned near the respective centers of gravity 114a, 114b, and 114c of the partial objects 111a, 111b, and 111c. As a result, even in the target object 110 as shown in FIG. 17, the supports 30M are able to stably support the load of the target object 110.

Other Preferred Embodiments

In the foregoing preferred embodiments, the region dividing processor 62 preferably is configured or programmed to divide the placement surface 82, for example, into two regions, the first region 91 and the second region 92. The region dividing processor 62, however, may divide the placement surface 82 into three or more regions. For example, when the placement surface 82 is to be divided into a first region, a second region, and a third region, the first region is a region containing the reference point. The second region is a region that excludes the first region and is closer to the reference point than the third region. The third region is a region that excludes the first region and the second region and is more distant from the reference point than the first region and the second region.

In this case, the arranging processor 63 attaches and arranges the supports 30 on the first region, the second region, and the third region in the following manner. The arranging processor 63 attaches and arranges the supports 30 so that a contact area per unit area between the first region and the supports is larger than a contact area per unit area between the second region and the supports and a contact area per unit area between the third region and the supports. Then, the arranging processor 63 attaches and arranges the supports 30 so that the contact area per unit area between the second region and the supports is larger than the contact area per unit area between the third region and the supports.

Figure 20:
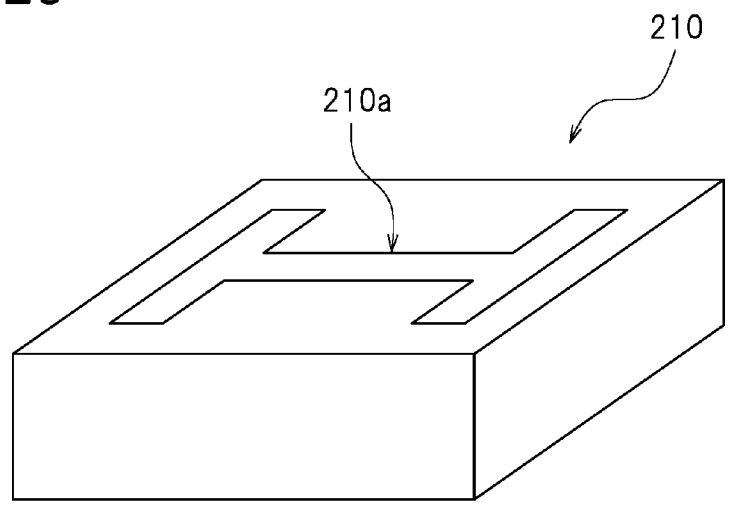
FIG. 20 is a view for illustrating a forbidden surface, which illustrates one example of the target object.
Figure 21:
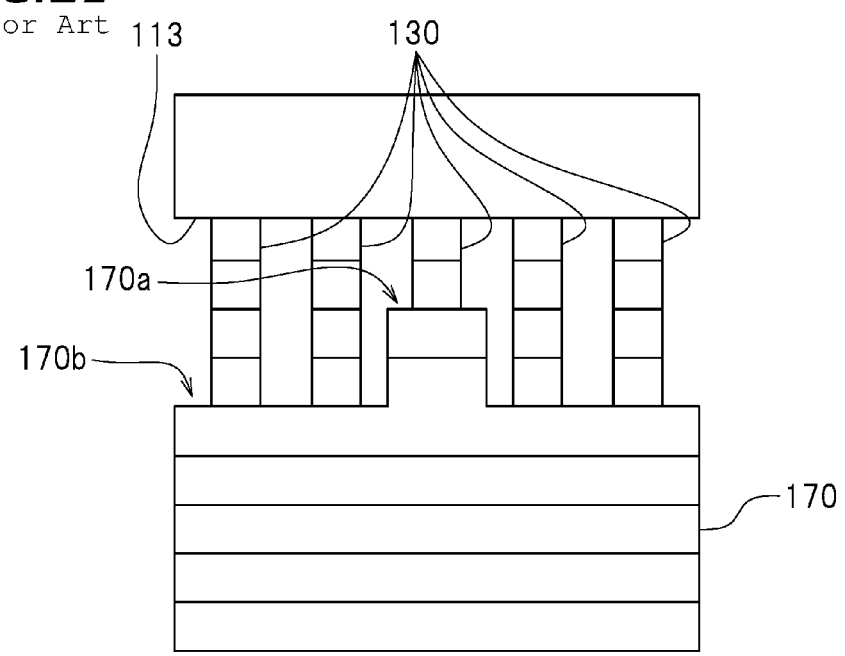
FIG. 21 is a schematic view illustrating how a target object and supports are formed on the holder according to conventional technology.

FIG. 20 is a view illustrating a target object 210, which shows a decorative surface 210a. As illustrated in FIG. 20, the target object 210 may have a decorative surface 210a that is decorated with such things as characters or patterns. In the present preferred embodiment, the decorative surface 210a corresponds to a "forbidden surface". When forming such a target object 210, it is preferable that no support 30 be attached or arranged on the decorative surface 210a. The reason is that there is a risk of damaging the decorative surface 210a of the target object 210 when peeling supports 30 away from the target object 210. Accordingly, when the target object 210 has a decorative surface 210a on which no support 30 should be attached or arranged, it is preferable to determine the position and orientation of the target object 210 so that no support 30 is attached or arranged on the decorative surface 210a, in addition to the condition that the supports 30 are able to sufficiently support the load of the target object 210.

In the present preferred embodiment, when the supports 30 are attached and arranged on a target object model corresponding to the target object 210 having the decorative surface 210a, the placement surface determining processor 60 determines a placement surface among the surfaces of the target object model excluding the decorative surface 210a. More specifically, the rotation processor 67 calculates a nearest point that is closest to the center of gravity of the target object model among the points on the outer circumferential surfaces excluding the decorative surface 210a in the target object model tilted by the tilting processor 66, and rotates the target object model around the principal axis of the target object model so that the nearest point is brought into a position overlapping the principal axis when viewed in a plan view. Herein, the nearest point is positioned in one of the surfaces of the target object model excluding the decorative surface 210a. The arranging processor 63 attaches and arranges the supports 30 on the surface where the nearest point is positioned (i.e., on the placement surface).

Thus, the supports 30 are able to support the load of the target object 210 without attaching and arranging the supports 30 on the decorative surface 210a.

Modified Preferred Embodiments

In the foregoing preferred embodiments, the arrangement determining apparatus 100 preferably determines the position arrangement of the supports 30 so that the supports 30 are attached and arranged on the bottom surface of the target object model 72. It is also possible, however, that the supports 30 may be provided on the top surface of the target object model 72. In this case, the rotation processor 67 rotates the target object model 72 around the principal axis 78 so as to bring the nearest point 80, which is a point on the outer circumferential surfaces of the target object model 72 that has been tilted by the tilting processor 66 and which is closest to the center of gravity 74 of the target object model 72, into a position that overlaps the principal axis 78, when viewed in a plan view, and also is above the principal axis 78. Then, the arranging processor 63 attaches and arranges the supports 30 on the surface that contains the nearest point 80 in the target object model 72 rotated by the rotation processor 67, that is, the top surface of the target object model 72. In this case, the top surface of the target object model 72 is the placement surface.

In the present preferred embodiments, the principal axis setting processor 65 sets the principal axis 78 of the target object model 72 using the centers of gravity of a plurality of polygons that form the target object model 72. The principal axis 78 is the line connecting the center of gravity 74 of the target object model 72 with one of the centers of gravity of a plurality of triangular polygons (herein, the farthest point 76). The principal axis 78 may, however, be the line connecting the center of gravity 74 of the target object model 72 with one of the vertices of a plurality of triangular polygons that is most distant from the center of gravity 74. In this case, the principal axis setting processor 65 calculates respective distances between the center of gravity 74 of the target object model 72 and the vertices of a plurality of triangular polygons that form the target object model 72. Then, the principal axis setting processor 65 may define a vertex of the triangular polygon corresponding to the greatest distance among a plurality of distances between the center of gravity 74 of the target object model 72 and the vertices of a plurality of triangular polygons to be the farthest point, and set the line connecting the farthest point and the center of gravity 74 of the target object model 72 as the principal axis 78.

For example, it is possible that a shape of a human body with arms spread laterally (the shape is hereinafter simply referred to as the "human body shape") needs to be formed. In this case, the loads of the arm portions and the leg portions are lower than, for example, that of the torso portion. Accordingly, when it is required to form a target object having a region with a relatively lower load, it is possible to set the farthest point in a region excluding the region with a lower load, i.e., the region with a relatively higher load, to set the principal axis by the principal axis setting processor 65. For example, when the human body shape is the target object, it is possible to set the farthest point in the region excluding the arms and the legs, which have a relatively lower load, to set the principal axis.

Alternatively, when the target object is such an object including thin rod-shaped objects that extend outward from the surfaces of a cubic-shaped object, for example, it is possible that the load on the rod-shaped objects may be negligible relative to the total load of the entire target object. In this case, it is possible to set the farthest point in the cubic-shape object of the target object excluding the rod-shaped objects to set the principal axis by the principal axis setting processor 65. In this way, it is possible to appropriately select the region where the farthest point should be set according to the shape of the target object. The region where the farthest point should be set may be selected by the user, for example. In these cases as well, the supports 30 are able to be attached and arranged in the region of the target object where the load is relatively high. Therefore, the supports 30 are able to be attached and arranged at optimum positions on the target object.

The foregoing preferred embodiments and modified preferred embodiments may be combined as desired.

As described previously, the processors in the arrangement determining apparatus 100, namely the storing processor 52, the pre-processing processor 54, the center-of-gravity calculating processor 56, the reference processor 58, the placement surface determining processor 60, the reference point setting processor 61, the region dividing processor 62, the arranging processor 63, the display processor 64, the principal axis setting processor 65, the tilting processor 66, and the rotation processor 67, may be implemented by a single processor provided in the arrangement determining apparatus 100. However, these processors may be implemented by a plurality of processors. In various preferred embodiments of the present invention, the configuration may preferably include executing a computer program stored in a computer. Various preferred embodiments of the present invention may preferably include a non-transitory computer readable medium in which the computer program is temporarily stored. Various preferred embodiments of the present invention may also include a circuit that implements the same functions as those implemented by the programs executed by the respective processors. When this is the case, it is possible that the storing processor 52, the pre-processing processor 54, the center-of-gravity calculating processor 56, the reference processor 58, the placement surface determining processor 60, the reference point setting processor 61, the region dividing processor 62, the arranging processor 63, the display processor 64, the principal axis setting processor 65, the tilting processor 66, and the rotation processor 67 be replaced with a storing circuit 52, a pre-processing circuit 54, a center-of-gravity calculating circuit 56, a reference circuit 58, a placement surface determining circuit 60, a reference point setting circuit 61, a region dividing circuit 62, an arranging circuit 63, a display circuit 64, a principal axis setting circuit 65, a tilting circuit 66, and a rotation circuit 67, respectively.

The terms and expressions which have been used herein are used as terms of description and not of limitation. There is no intention in the use of such terms and expressions of excluding any equivalents of any of the features shown or described, or portions thereof, and it is recognized that various modifications are possible within the scope of the present invention. The present invention may be embodied in many different forms. This disclosure should be considered as providing exemplary preferred embodiments of the principles of the present invention. These preferred embodiments are described herein with the understanding that such preferred embodiments are not intended to limit the present invention to any specific preferred embodiments described and/or illustrated herein. The present invention is not limited to specific preferred embodiments described herein. The present invention encompasses all the preferred embodiments including equivalents, alterations, omissions, combinations, improvements, and/or modifications that can be recognized by those skilled in the arts based on this disclosure. Limitations in the claims should be interpreted broadly based on the language used in the claims, and such limitations should not be limited to specific preferred embodiments described in the present description or discussed during prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing system comprising:
    a three-dimensional printing apparatus that forms a target object and supports; and
    a support arrangement determining apparatus that determines a position arrangement of supports, for use with the three-dimensional printing apparatus wherein the supports are attached and arranged on the target object to be formed to form the target object and the supports, the arrangement determining apparatus comprising:
    a storing processor configured or programmed to store data of a three-dimensional model of the target object;
    a center-of-gravity calculating processor configured or programmed to calculate a center of gravity of the three-dimensional model stored in the storing processor;
    a placement surface determining processor configured or programmed to determine a placement surface of the three-dimensional model on which the supports are attached and arranged;
    a reference point setting processor configured or programmed to draw a perpendicular line from the center of gravity calculated by the center-of-gravity calculating processor toward the placement surface determined by the placement surface determining processor, and set a reference point at which the perpendicular line and the placement surface intersect;
    a region dividing processor configured or programmed to divide the placement surface determined by the placement surface determining processor into a first region and a second region, the first region being within a predetermined area containing the reference point set by the reference point setting processor, and the second region excluding the first region; and an arranging processor configured or programmed to attach and arrange the supports on the placement surface so that, in the first region and the second region divided by the region dividing processor, a contact area per unit area between the first region and the supports attached and arranged in the first region is larger than a contact area per unit area between the second region and the supports attached and arranged in the second region, wherein the three-dimensional printing device forms the target object and the supports attached and arranged by the arranging processor.

2. The three-dimensional printing system according to claim 1, wherein the arranging processor is configured or programmed to attach and arrange first supports having a first thickness in the first region, and second supports having a second thickness in the second region, the second thickness being less than the first thickness.

3. The three-dimensional printing system according to claim 1, wherein the arranging processor is configured or programmed to attach and arrange the supports on the placement surface so that a number of the supports attached and arranged in the first region per unit area of the first region is larger than a number of the supports attached and arranged in the second region per unit area of the second region.

4. The three-dimensional printing system according to claim 1, wherein the arranging processor is configured or programmed to attach and arrange one of the supports on the reference point of the placement surface.

5. The three-dimensional printing system according to claim 1, wherein the region dividing processor is configured or programmed to divide the placement surface into the first region and the second region so that the reference point is disposed at a center of the first region.

6. The three-dimensional printing system according to claim 1, wherein the target object includes a forbidden surface on which the supports are not attached or arranged; and the placement surface determining processor is configured or programmed to determine the placement surface among the surfaces of the three-dimensional model excluding the forbidden surface.

7. The three-dimensional printing system according to claim 1, wherein the arrangement determining apparatus further comprises:

a display screen configured or programmed to display the three-dimensional model on which the supports are attached and arranged by the arranging processor; and a display processor configured or programmed to enable the display screen to display the three-dimensional model on which the supports are attached and arranged.

* * * * *